United States Patent
Taketa et al.

(10) Patent No.: US 10,611,057 B2
(45) Date of Patent: Apr. 7, 2020

(54) PROCESS OF PRODUCING FIBER-REINFORCED PLASTIC

(71) Applicant: Toray Industries, Inc., Tokyo (JP)

(72) Inventors: Ichiro Taketa, Masaki (JP); Hiroaki Matsutani, Masaki (JP); Nobuyuki Arai, Masaki (JP); Narumichi Sato, Masaki (JP)

(73) Assignee: Toray Industries, Inc., Tokyo (JP)

( * ) Notice: Subject to any disclaimer, the term of this patent is extended or adjusted under 35 U.S.C. 154(b) by 470 days.

(21) Appl. No.: 15/512,057

(22) PCT Filed: Sep. 14, 2015

(86) PCT No.: PCT/JP2015/076000
§ 371 (c)(1),
(2) Date: Mar. 16, 2017

(87) PCT Pub. No.: WO2016/043155
PCT Pub. Date: Mar. 24, 2016

(65) Prior Publication Data
US 2017/0274560 A1    Sep. 28, 2017

(30) Foreign Application Priority Data
Sep. 19, 2014   (JP) .................................. 2014-191082

(51) Int. Cl.
*B29C 70/44*      (2006.01)
*B29B 15/10*      (2006.01)
(Continued)

(52) U.S. Cl.
CPC ............ *B29B 15/105* (2013.01); *B29B 15/12* (2013.01); *B29C 43/12* (2013.01); *B29C 43/52* (2013.01); *B29C 70/06* (2013.01); *B29C 70/44* (2013.01); *B29C 70/443* (2013.01); *B32B 5/28* (2013.01); *C08J 5/24* (2013.01); *D04H 3/115* (2013.01); *B29C 2043/525* (2013.01); *B29C 2043/527* (2013.01); *B29C 2043/562* (2013.01); *B29K 2063/00* (2013.01); *B29K 2105/06* (2013.01); *B29K 2105/0872* (2013.01); *B29K 2105/253* (2013.01)

(58) Field of Classification Search
CPC ............................. B29C 70/44; B29C 70/443
See application file for complete search history.

(56) References Cited

U.S. PATENT DOCUMENTS

| 4,267,147 A | 5/1981 | Pogoda et al. |
| 6,017,484 A | 1/2000 | Hale |
(Continued)

FOREIGN PATENT DOCUMENTS

| DE | 10 2011 000 945 A1 | 9/2011 |
| GB | 2 124 130 A | 2/1984 |
(Continued)

OTHER PUBLICATIONS

Extended European Search Report dated Apr. 18, 2018, of corresponding European Application No. 15843030.6.

*Primary Examiner* — Timothy Kennedy
(74) *Attorney, Agent, or Firm* — DLA Piper LLP (US)

(57) ABSTRACT

A process is capable of producing a high-quality fiber-reinforced plastic with good yield in a short molding cycle time despite being atmospheric pressure molding. The process characterized uses local contact heating to give different temperature conditions to produce a fiber-reinforced plastic by atmospheric pressure molding from a fiber-reinforced material which contains a reinforcing fiber impregnated with a thermosetting resin composition.

14 Claims, 9 Drawing Sheets

(51) Int. Cl.
      *C08J 5/24*       (2006.01)
      *B32B 5/28*       (2006.01)
      *B29C 43/12*      (2006.01)
      *B29C 43/52*      (2006.01)
      *B29B 15/12*      (2006.01)
      *B29C 70/06*      (2006.01)
      *D04H 3/115*     (2012.01)
      *B29C 43/56*      (2006.01)
      *B29K 105/08*     (2006.01)
      *B29K 63/00*      (2006.01)
      *B29K 105/06*     (2006.01)
      *B29K 105/00*     (2006.01)

(56) References Cited

U.S. PATENT DOCUMENTS

| | | |
|---|---|---|
| 6,139,942 A | 10/2000 | Hartness et al. |
| 6,270,603 B1 | 8/2001 | Westerman et al. |
| 2010/0140842 A1 | 6/2010 | Nelson et al. |
| 2011/0209812 A1 | 9/2011 | Bansal et al. |
| 2012/0247655 A1 | 10/2012 | Erb et al. |

FOREIGN PATENT DOCUMENTS

| | | | |
|---|---|---|---|
| JP | 53-58577 A | 5/1978 | |
| JP | 58-205727 A | 11/1983 | |
| JP | 62-104715 A | 5/1987 | |
| WO | WO-2012135754 A1 * | 10/2012 | ............... B32B 5/04 |

\* cited by examiner

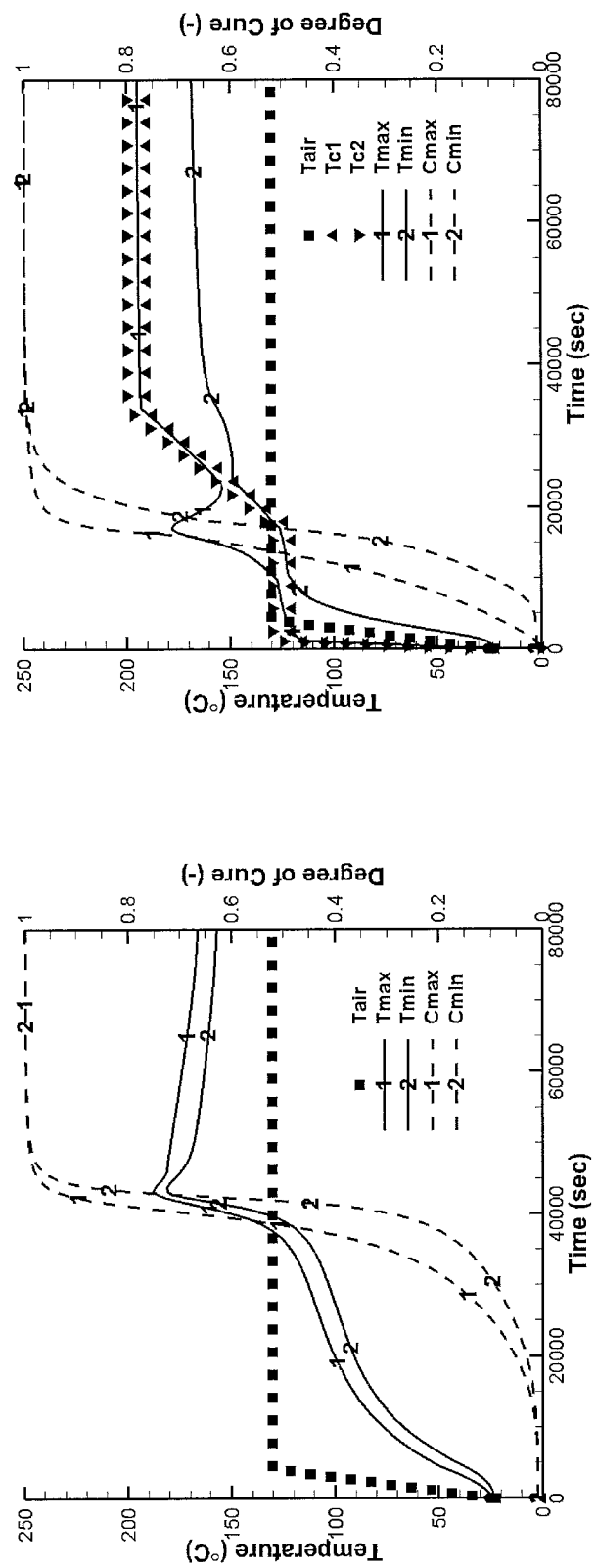

PROCESS OF PRODUCING FIBER-REINFORCED PLASTIC

TECHNICAL FIELD

This disclosure relates to a process of producing a fiber-reinforced plastic which has each step of: placing a fiber-reinforced material, which is impregnated with a thermosetting resin composition, in a closed space; sucking the closed space with a vacuum pump to pressurize the fiber-reinforced material by utilizing a pressure difference from an atmospheric pressure; and further heating and curing the fiber-reinforced material.

BACKGROUND

A fiber-reinforced plastic comprising a reinforcing fiber and a matrix resin exhibits a high specific strength and a high specific elastic modulus and is excellent in mechanical properties as well as has high functional properties such as weather resistance and chemical resistance and, therefore, the fiber-reinforced plastic is receiving a lot of attention also in applications for industry. The fiber-reinforced plastic has being applied to various applications for structural members for aircraft, spacecraft, automobiles, trains, marine vessels, electrical appliances, sports gear and the like, and the demand for the fiber-reinforced plastic is also increasing year after year.

Especially, a thermosetting resin has been used as a matrix for a long time because the viscosity of the thermosetting resin is lower than that of a thermoplastic resin and, therefore, the thermosetting resin is impregnated into fibers easier compared to the thermoplastic resin. Among the processes of producing these fiber-reinforced plastics, there are an autoclave molding method and a press molding method as high-quality molding methods with less voids and the like. The former has had a problem that the molding equipment is large in size and initial costs are too much, and the latter has had a problem that a double-sided mold is required and the size of the member which is capable of being pressurized is limited.

As such, in recent years, there has been an attempt to mold a fiber-reinforced plastic by an out-of-autoclave molding method which uses a vacuum pump and an oven (for example, U.S. Pat. No. 6,139,942). Research on an atmospheric pressure molding method has been progressing as follows. The atmospheric pressure molding method comprises using a partially impregnated prepreg which has a reinforcing fiber partially impregnated with a matrix resin, and evacuating internal air and volatile components from the prepreg with a vacuum pump through an unimpregnated part among the reinforcing fibers within the prepreg, and finally, the resin is impregnated into the reinforcing fibers in the partially impregnated prepreg. This method has advantages that relatively reduced initial costs are required because the molding apparatus is an oven and large size members are easily molded because the method employs vacuum pressurization by using a single-sided mold.

On the other hand, a process of producing a reinforced plastic from a fiber-reinforced material containing a reinforcing fiber impregnated with a thermosetting resin composition by using a vacuum pump and an oven has a problem that the impregnation time and the molding cycle time are longer than those of the autoclave molding method and the press molding method because the pressure difference which promotes the resin impregnation is 1 atm or lower, and an additional problem that voids tend to remain easily and the defective rate is high. In addition, that process of producing the reinforced plastic by using the vacuum pump and the oven has problems that the time for raising the temperature is long and the molding cycle time is long especially in large size members because heat is transferred from air under an atmospheric pressure in that process, in contrast to the autoclave molding method and the press molding method in which heat is transferred from a high pressure gas and a metal having good thermal conductivity, respectively and, therefore, the temperature of the fiber-reinforced plastic can be rapidly raised to a desired temperature. As a result, that process of producing the reinforced plastic by using the vacuum pump and the oven has a further problem that the productivity is reduced compared to the autoclave molding method and the press molding method.

Therefore, based on the above-described background, it could be helpful to provide a process of producing a fiber-reinforced plastic capable of employing atmospheric pressure molding and capable of producing a high-quality fiber-reinforced plastic with good yield in a short molding cycle time.

SUMMARY

We thus provide:

(1) A process of producing a fiber-reinforced plastic, the process comprising:

placing a fiber-reinforced material which contains a reinforcing fiber impregnated with a thermosetting resin composition between a single-sided mold and a bagging film to form a closed space created by the single-sided mold and the bagging film;

sucking the closed space with a vacuum pump to pressurize the fiber-reinforced material by utilizing a pressure difference from an atmospheric pressure;

locally heating the fiber-reinforced material by using a contact heat source under a temperature condition different from an atmosphere temperature in a state where the fiber-reinforced material is pressurized; and curing the fiber-reinforced material to mold the fiber-reinforced plastic.

(2) The process of producing the fiber-reinforced plastic according to the above-described process, wherein the temperature condition given by the contact heat source is continuously changed.

(3) The process of producing the fiber-reinforced plastic according to 1 or 2, wherein at least a part of the fiber-reinforced material is contacted with an atmospheric-pressure and ambient-temperature atmosphere through the bagging film and wherein the atmospheric-pressure and ambient-temperature atmosphere is used as a cooling source.

(4) The process of producing the fiber-reinforced plastic according to any one of the above-described processes, comprising the step of:

performing heating by contacting the contact heat source with a part of a surface of the fiber-reinforced material which does not face the single-sided mold or with a part of the bagging film; or performing cooling by contacting a contact cooling source with a part of a surface of the fiber-reinforced material which does not face the single-sided mold or with a part of the bagging film.

(5) The process of producing the fiber-reinforced plastic according to any one of the above-described processes, wherein the fiber-reinforced material has a thick portion and a thin portion, and wherein a temperature condition during molding is set such that the temperature rising rate of the thick portion is higher than the temperature rising rate of the thin portion at first, and thereafter, the temperature rising rate of the thick portion is lower than the temperature rising rate of the thin portion.

(6) The process of producing the fiber-reinforced plastic according to any one of the above-described processes, wherein the temperature condition of the contact heat source is determined by a heat transfer analysis which considers cure kinetics parameters of a thermosetting resin under a constraint condition that the maximum temperature in the fiber-reinforced material does not exceed a predetermined temperature during molding.

(7) The process of producing the fiber-reinforced plastic according to any one of the above-described processes, wherein the fiber-reinforced material has a discontinued part of the reinforcing fiber at an end part, and wherein the end part of the fiber-reinforced material is heated in a state where a plurality of the fiber-reinforced materials are laminated such that the discontinued parts of the reinforcing fibers are contacted together.

(8) The process of producing the fiber-reinforced plastic according to any one of the above-described processes, wherein the temperature condition is designed in a direction for eliminating the warpage of the obtained fiber-reinforced plastic, by predicting the strain of the fiber-reinforced material during molding by solving the balance of the forces considering the thermal contraction and the curing contraction as well as the viscoelastic characteristics of the resin which are calculated based on the distribution of temperatures and degrees of cure which is predicted by the heat transfer analysis which considers cure kinetics parameters of the thermosetting resin.

(9) The process of producing the fiber-reinforced plastic according to any one of the above-described processes, wherein for a fiber-reinforced material which has a thickness distribution, a temperature at an approximately central part in the thickness direction of the maximum thickness portion, which is Ta [° C.], is measured and the temperature condition of the contact heat source is determined such that a temperature at the minimum thickness portion, which is Tb [° C.], satisfies: Ta−5° C.<Tb<Ta+5° C.

(10) The process of producing the fiber-reinforced plastic according to any one of the above-described processes, wherein a temperature capable of holding a viscosity of the thermosetting resin composition of 10 Pa·s or lower for 90 minutes or longer is held, a degree of impregnation of the thermosetting resin composition into the fiber-reinforced material is measured, and temperature rising is performed at a stage where the impregnation is completed.

(11) The process of producing the fiber-reinforced plastic according to any one of the above-described processes, wherein the fiber-reinforced material which comprises the reinforcing fiber impregnated with the thermosetting resin composition is a partially impregnated prepreg which has a first layer which comprises at least the reinforcing fiber and a second layer which comprises the reinforcing fiber impregnated with the thermosetting resin composition and has a degree of impregnation of the thermosetting resin composition into the fiber-reinforced material of from 10 to 90 volume %, and wherein the partially impregnated prepregs are laminated before heating.

(12) The process of producing the fiber-reinforced plastic according to the above-described process, wherein the partially impregnated prepreg has the second layers on both sides of the first layer, and wherein the second layer has a layer A which comprises the reinforcing fiber impregnated with the thermosetting resin composition and a layer B which includes a particle or a fiber of a thermoplastic resin, and wherein the layer B is placed on the surface of the partially impregnated prepreg.

(13) The process of producing the fiber-reinforced plastic according to any one of the above-described processes, wherein a thickness of a laminate obtained by laminating the partially impregnated prepregs is thicker by 5 to 50% than a thickness of the fiber-reinforced plastic after curing.

It is possible to produce a high-quality product of a fiber-reinforced plastic with reduced initial costs for production equipment and reduced limitations on the size of the member which can be molded in high productivity with good yield.

BRIEF DESCRIPTION OF THE DRAWINGS

FIG. 6A is a graph showing a time course of a controlled temperature and a temperature in a fiber-reinforced material by a conventional oven heating method.

FIG. 6B is a graph showing a time course of a controlled temperature and a temperature in a fiber-reinforced material by using oven heating and local contact heating in combination.

DESCRIPTION OF REFERENCE SIGNS

Figure 1:
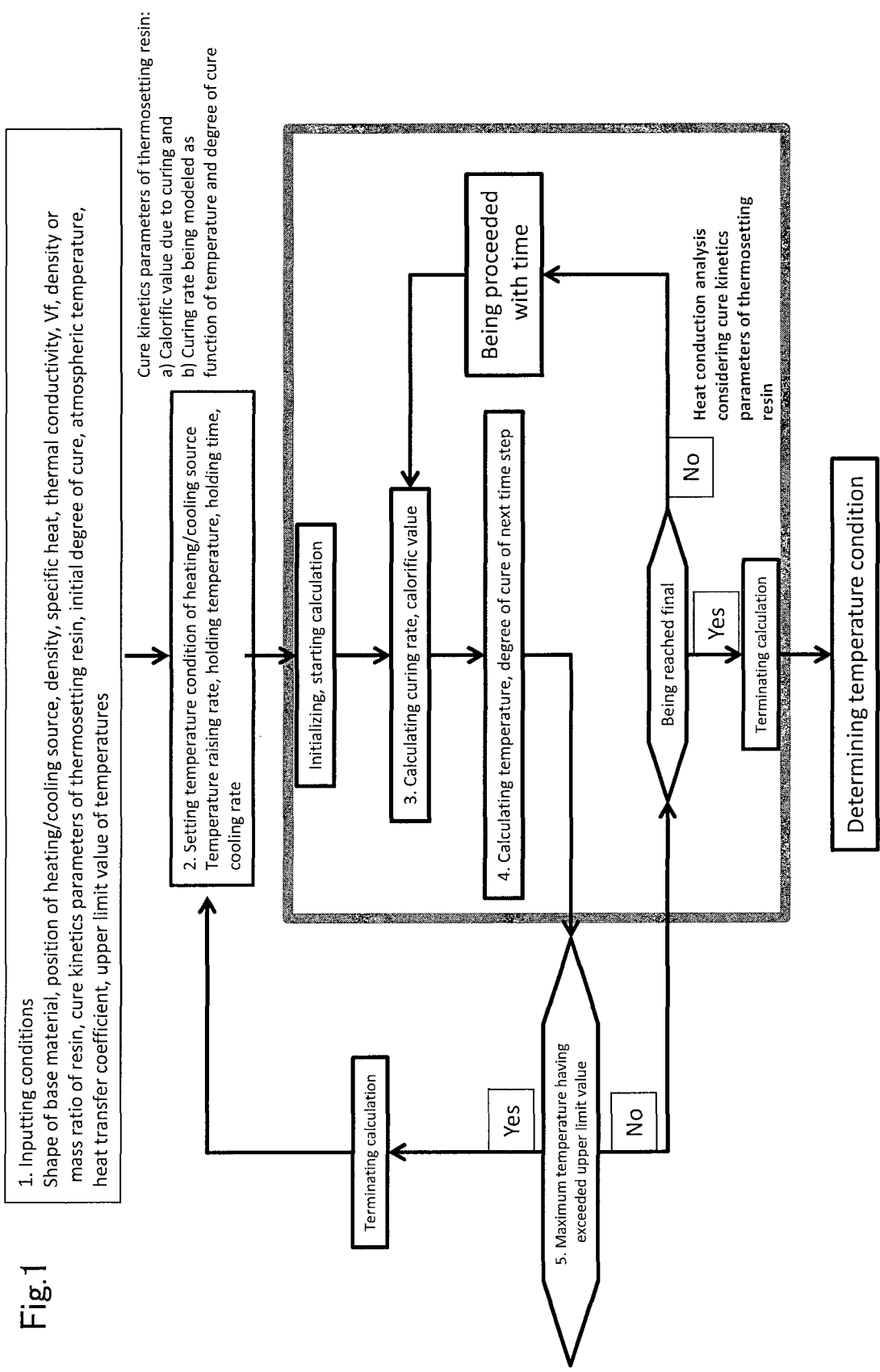
FIG. 1 is a flowchart showing an example of procedures of designing a temperature condition of a heat source from a heat transfer analysis which considers cure kinetics parameters of a thermosetting resin.

1: Fiber-reinforced material
2: Single-sided mold
3: Contact heat source of uniform temperature
4: Contact heat source of non-uniform temperature
5: Heat insulation material
6: Bagging film

DETAILED DESCRIPTION

We produced a high-quality product of a fiber-reinforced plastic capable of producing large-sized members, stably with reduced initial costs for production equipment in a shortened producing cycle time with reduced voids and the warpage. Our process comprises: placing a fiber-reinforced material which contains a reinforcing fiber impregnated with a thermosetting resin composition between a single-sided mold and a bagging film to form a closed space; sucking the closed space with a vacuum pump to pressurize the fiber-reinforced material by utilizing a pressure difference from an atmospheric pressure; heating the fiber-reinforced material by using a contact heat source which is locally contacted with the fiber-reinforced material under a temperature condition different from an atmosphere temperature; and curing the fiber-reinforced material to mold a fiber-reinforced plastic.

It is possible to mold the fiber-reinforced plastic even when a single-sided mold is used, and there are reduced limitations on the size of a molded product without requiring an expensive equipment investment such as an autoclave and a press molding machine. Though whole heating may be performed by using an oven, molding is performed by heating at least a part by using a contact heat source having high heat transfer efficiency, and the temperature condition is changed locally. As a result, the warpage of a product and the molding cycle time can be reduced by giving the optimum heating condition to the shape, the thickness and the material, while the residual stress is reduced by uniformly heating the whole fiber-reinforced material. In particular, in a fiber-reinforced plastic having a difference in thickness depending on its portion, when heating is performed by using an oven at a uniform atmosphere temperature, in a thick portion, the temperature followability is inferior at an early stage in the temperature rising and, therefore, the thick portion is hard to be warm. On the contrary, at a later stage, the heat storage in the thick portion occurs because a curing reaction of a thermosetting resin starts and, therefore, the temperature at the thick portion is easy to be high. As a result, mechanical properties of a fiber-reinforced plastic may decrease due to the deterioration of the resin. Accordingly, in a conventional molding method, it is required that the temperature rising rate is made to be low and, therefore, the molding cycle time has tended to be long after all. In addition, the thermal contraction and the curing contraction at the thick portion become large and, therefore, the warpage tends to occur in the product by the non-uniform thermal residual stress.

On the other hand, our heating is locally controlled and, therefore, for example, it is possible to heat a thick portion quickly, and when a curing reaction of a thermosetting resin starts, it is possible to perform slow cooling of the thick portion or to stop heating of the thick portion. As a result, the whole heat distribution can be averaged and, in addition, the time for molding can be also shortened. Accordingly, our process is particularly suitable for molding a member having a difference in thickness depending on its portion. Heating may be performed only by local contact heating. In addition, heating may be performed such that curing of a part is made to proceed by contact heating and, thereafter, curing is completed by heating with an oven as a whole. Further, it is possible to perform both local contact heating and heating as a whole with an oven in combination. Among them, it is preferable that heating is performed only by using the contact heat source. By performing heating only by using the contact heat source, an oven which occupies a large space is made unnecessary, and it becomes easier to mold large size members, and initial costs for the oven are also made unnecessary. Furthermore, heating may be performed by using a plurality of contact heat sources each of which gives a different temperature condition. Meanwhile, "a contact heat source" may be a heat source which directly contacts the fiber-reinforced material or may be a heat source which contacts a single-sided mold, a bagging film, a subsidiary material or the like each of which contacts the fiber-reinforced material. In the latter case, the heat source is a heat source that indirectly contacts the fiber-reinforced material.

Preferably, the temperature condition given by the contact heat source is continuously changed. The oven and the autoclave transfer the heat through gases and, therefore, there is a time lag between an input temperature and the temperature of the fiber-reinforced material which is actually heated. Accordingly, in using the oven or the autoclave, the temperature can be roughly controlled only, for example, by setting heat conditions stepwise and the like. However, in contact heating, the temperature at the contact part can be made approximately the same as the set temperature and, therefore, it is also possible to control the temperature at every±1° C. In addition, the contiguous temperature conditions may be set depending on the portion to shorten the molding cycle time or control the distribution of thermal residual stress.

In addition, preferably, at least a part of the fiber-reinforced material is contacted with an atmospheric-pressure and ambient-temperature atmosphere through the bagging film. As a result, it is possible to use the atmospheric-pressure and ambient-temperature atmosphere as a cooling source. Since the thermosetting resin generates heat by the curing reaction, when the heat is stored, a temperature within the material exceeds the temperature at the contact heat source and, therefore, the control of temperatures within the material becomes difficult. In general, the heat transfer is performed through gases in the oven or the autoclave, but in such a case, the temperature difference between the gases and the fiber-reinforced material is small and, therefore, a long period of time is required for the heat dissipation. On the other hand, like our process, when a part of the material is contacted with an atmospheric-pressure and ambient-temperature atmosphere, the heat is easily dissipated because the temperature difference is large and, therefore, the heat storage is suppressed. Accordingly, it becomes easier to control the temperature and curing.

In addition, it is preferable that the process has the step of: performing heating by contacting the contact heat source with a part of a surface of the fiber-reinforced material which does not face the single-sided mold or with a part of the bagging film; or performing cooling by contacting a contact cooling source with a part of a surface of the fiber-reinforced material which does not face the single-sided mold or with a part of the bagging film. When there is a dispersion in the thickness of the fiber-reinforced material, when heating is performed only from the side of the single-sided mold, a dispersion occurs in the distribution of temperatures and degrees of cure, since the thermal conductivity of the fiber-reinforced material in the thickness direction is low. Accordingly, by performing heating not only from the side of the single-sided mold but also the side of the bagging film, the difference in temperatures depending on portions can be reduced, and the control of the temperature and curing becomes easier. Further, by performing cooling in a positive manner by using the cooling source, an excess temperature can be suppressed at a portion where the distance from the atmospheric-pressure and ambient-temperature atmosphere is long and the heat dissipation is insufficient.

In addition, it is preferable that the fiber-reinforced material has a thick portion and a thin portion, and a temperature condition during molding is set such that the temperature rising rate of the thick portion is higher than the temperature rising rate of the thin portion at first and, thereafter, the temperature rising rate of the thick portion is lower than the temperature rising rate of the thin portion. Since a central part of the thick portion in the thickness direction is hardly heated and is hardly cooled, it is preferable that the thick portion is heated at a high temperature rising rate, immediately after the start of heating. When the thick portion is sufficiently heated and the temperature rising due to the heat generation during curing starts, it is preferable that the temperature rising rate is lowered with subtracting the influence of the temperature rising due to curing. In contrast, since the thin portion is easily heated and is easily cooled, the temperature at the contact heat source is much more quickly reflected in the temperature at the thin portion in the thickness direction than in the temperature at the thick portion and, therefore, it is preferable that the thin portion is heated at a lower temperature rising rate than the thick portion depending on the temperature change in the central part in the thickness direction of the thick portion immediately after the start of heating. It is also preferable that when the temperature rising due to the heat generation during curing starts at the central part in the thickness direction of the thick portion, the thin portion is heated at a higher temperature rising rate than the thick portion depending on the temperature rising due to curing. As such, the temperature at the central part in the thickness direction of the thick portion and the temperature at the central part in the thickness direction of the thin portion can be matched and, therefore, the progress of curing can be equalized.

Further, it is preferable that the temperature condition of the contact heat source is determined by a heat transfer analysis which considers cure kinetics parameters of a thermosetting resin under a constraint condition that the maximum temperature in the fiber-reinforced material does not exceed a predetermined temperature during molding. A specific procedure is as shown in FIG. 1. The process comprises the following 5 steps. Meanwhile, cure kinetics parameters of a thermosetting resin are composed of: a) a heat of reaction due to curing; and b) a curing rate expressed as a function of a temperature and a degree of cure, which is also referred to as a curing rule of a thermosetting resin.

(1) The step of inputting a shape, a thermal conductivity, a specific heat and a density of a material, a density or a mass ratio of a resin, Vf (a volume fraction of fibers), cure kinetics parameters and an initial degree of cure of the thermosetting resin, an atmospheric temperature, a heat transfer coefficient, an upper limit value of temperatures and a position of a contact heat source or a cooling source;

(2) the step of inputting a temperature condition of the contact heat source or the cooling source;

(3) the step of calculating a curing rate and an instantaneous amount of reaction heat from the temperature and the degree of cure by using cure kinetics parameters;

(4) the step of calculating a temperature and a degree of cure in the material by solving a heat transfer equation from the curing rate and the instantaneous amount of reaction heat; and (5) the step of judging whether the constraint condition is violated or not.

When the constraint condition is violated in step (5), it is required to return to step (2), and then the calculation is again performed by changing the temperature condition of the contact heat source or the cooling source. When the constraint condition is not violated in step (5), the procedure is advanced with time by repeating steps (3) to (5) until the set temperature condition is terminated. It is preferable that the temperature condition of the contact heat source or the cooling source is designed according to this procedure not to achieve a temperature at which the resin is thermally deteriorated and mechanical properties of the fiber-reinforced plastic are in danger of being decreased. Among temperature conditions, in particular, a temperature rising rate is important. For example, in a thick portion, the temperature is controlled not to exceed the set maximum temperature in the central part of the thick portion as a result that the temperature rising rate at a low temperature is made to be maximum and the temperature rising rate of the contact heating is lowered or the temperature of the contact heating is lowered at a stage where the reaction starts and the reaction heat starts to be generated or at a stage where the temperature rising rate due to the reaction heat exceeds the predetermined level.

Furthermore, it is preferable that the fiber-reinforced material has a part where the reinforcing fiber is discontinued, that is, a discontinued part of the reinforcing fiber, and that an end part of the fiber-reinforced material is heated in a state where a plurality of the fiber-reinforced materials are laminated such that the discontinued parts of the reinforcing fibers are contacted together. The fiber-reinforced material has a sheet shape, and an end part of the fiber-reinforced material is formed by cutting the sheet-shaped fiber-reinforced material to a desired shape. The desired-shaped sheets of the fiber-reinforced material are laminated and the laminate is placed in a mold. When the sheet-shaped fiber-reinforced material is cut in a direction other than the direction parallel to the direction of orientation of the reinforcing fibers, the discontinued part of the reinforcing fiber is formed at the end part. In general, the thermal conductivity of the fiber-reinforced material in the direction of fibers is higher than the thermal conductivity of the fiber-reinforced material in the thickness direction at least several times. It is possible that heat is transferred in the direction of fibers by performing heating from the end part of the fiber-reinforced material, especially from the discontinued part of the reinforcing fiber, even though the area of the part is small. Accordingly, an effect equal to or more than that of heating a large area in a surface of the fiber-reinforced material may be obtained. In addition, the similar effect to the above can be obtained in cooling.

In addition, in the heating, it is preferable that a temperature at a central part in in-plane direction formed by the fiber-reinforced material is higher than a temperature at a peripheral part. It is preferable that gases are moved from the central part to the end part when gases in the fiber-reinforced material are discharged. Therefore, when the temperature at the central part is higher than the temperature at the peripheral part, the viscosity of the resin at the central part becomes low, and gases are moved to the peripheral part by the progress of impregnation. It is possible to perform molding without leaving any voids in the central part by raising the temperature with monitoring the completion of impregnation such that gases are gradually moved to the end part where gases can be discharged.

Figure 2:
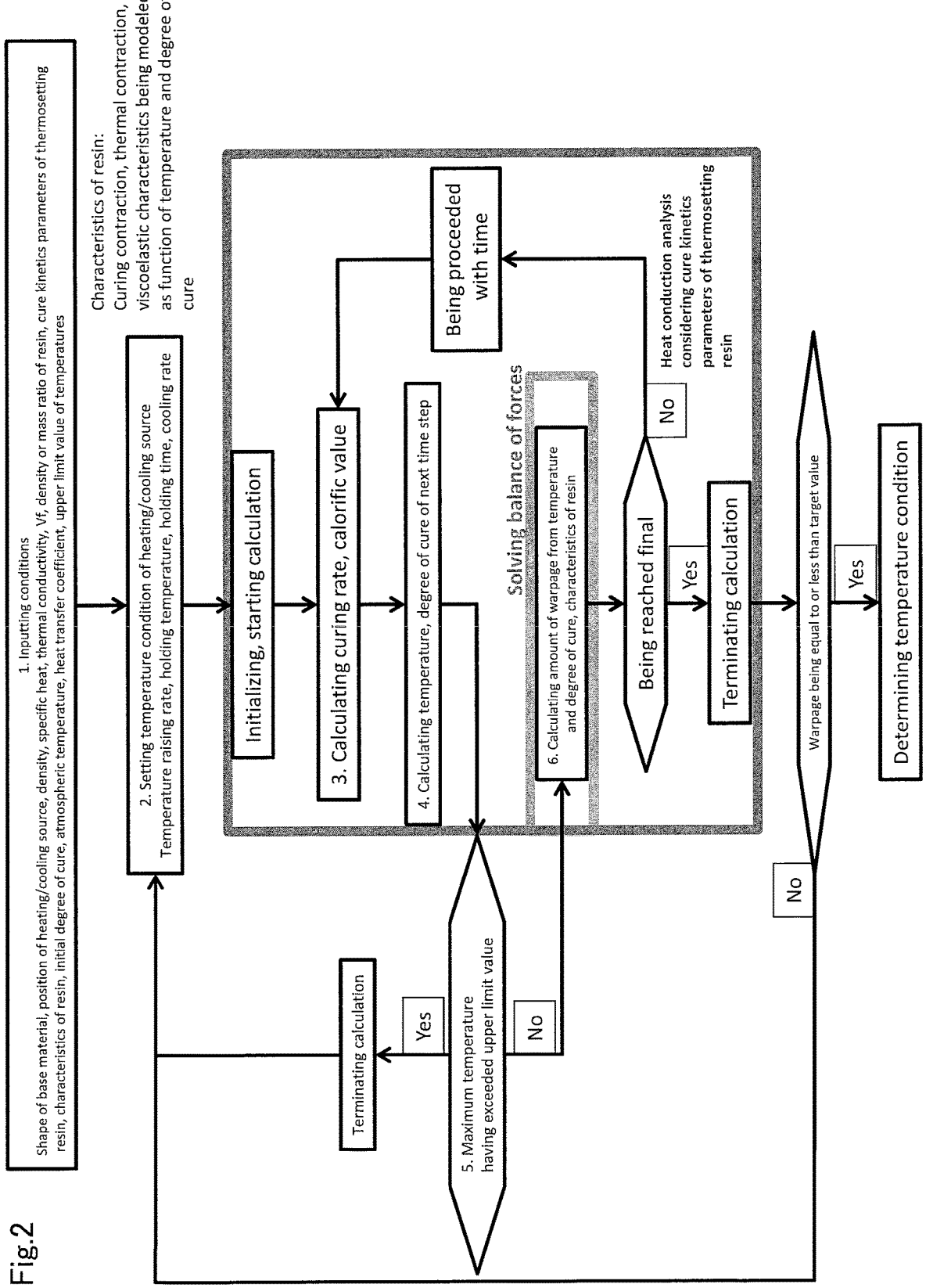
FIG. 2 is a flowchart showing an example of procedures of designing a temperature condition of a heat source in a direction to eliminate the warpage by calculating the warpage of a fiber-reinforced plastic, wherein the calculation is performed by conducting a heat transfer analysis which considers cure kinetics parameters of a thermosetting resin and solving the balance of the forces considering the thermal contraction and the curing contraction as well as the viscoelastic characteristics of the resin.

In addition, it is preferable that the temperature condition is designed in a direction to eliminate warpage of the obtained molded product (the fiber-reinforced plastic), by predicting the strain of the fiber-reinforced material during molding by solving the balance of the forces considering the thermal contraction and the curing contraction as well as the viscoelastic characteristics of the resin that are calculated based on the distribution of temperatures and degrees of cure predicted by the heat transfer analysis that considers cure kinetics parameters of the thermosetting resin. A specific procedure is as shown in FIG. 2. The process comprises the following steps.

(1) The step of inputting a shape, a thermal conductivity, a specific heat and a density of a material, a density or a mass ratio of a resin, Vf, cure kinetics parameters and an initial degree of cure of the thermosetting resin, deformation characteristics (the thermal contraction and the curing contraction as well as the viscoelastic characteristics which are made to be functions of a temperature and a degree of cure) of the resin, an atmospheric temperature, a heat transfer coefficient, an upper limit value of temperatures and a position of a contact heat source or a cooling source;

(2) the step of inputting a temperature condition of the contact heat source or the cooling source;

(3) the step of calculating a curing rate and an instantaneous amount of reaction heat from the temperature and the degree of cure by using cure kinetics parameters;

(4) the step of calculating a temperature and a degree of cure in the material by solving a heat transfer equation from the curing rate and the instantaneous amount of reaction heat;

(5) the step of determining whether the constraint condition is violated or not; and (6) the step of calculating the amount of the warpage of the material by solving the balance of the forces using a finite element method or the like, by calculating characteristics of the resin predicted from the temperature and the degree of cure.

When the constraint condition is violated in step (5), it is required to return to step (2), and then the calculation is again performed from the beginning by changing the temperature condition of the contact heat source or the cooling source. When the constraint condition is not violated in step (5), the procedure is advanced with time by repeating steps (3) to (6) until the set temperature condition is terminated. As a result, when the level of the obtained final warpage of the material exceeds a target value, the calculation is again performed from the beginning by changing the temperature condition. According to this procedure, the temperature condition of the contact heat source or the cooling source may be designed to achieve a temperature at which the resin is not thermally deteriorated and at which mechanical properties of the fiber-reinforced plastic are not in danger of being decreased as well as the value of the warpage is equal to or lower than the target value.

It is important to decrease the warpage of members made of a fiber-reinforced plastic for the next step at which the members are assembled. In metal, even when there are some gaps in the dimensional accuracy and plastic strains are developed at the time of the assembly by joining the members somewhat forcibly, the mechanical properties are not largely affected by the plastic strains. On the other hand, in fiber-reinforced plastic, even when there is only a small gap in the dimensional accuracy between members, forcible joining causes cracks in the resin or the fiber and, therefore, there is a possibility that the strength of a member is largely impaired. Accordingly, the work that gaps in dimension between the members are validated individually and the gaps are filled by inserting shims is a cost-increasing factor in the assembly step. The warpage of the fiber-reinforced plastic is determined by the distribution of the residual stress accumulated in each part, and the residual stress is largely influenced by the degrees of the thermal contraction and the curing contraction of the resin determined by the reaction mechanism of the resin as well as the viscoelastic characteristics of the resin which relax the thermal residual stress in the resin. These characteristics of the resin are functions of the heat history and the degree of cure of the resin. The degree of cure is obtained by reflecting the temperature from moment to moment at each part of the fiber-reinforced material during molding, and the thermal contraction factor and the curing contraction factor as well as the elastic modulus and the viscoelastic coefficient that are functions of the temperature and the degree of cure are determined. Thereafter, the stress-strain distribution is calculated such that the residual stress generated within the fiber-reinforced material is balanced, which enables the prediction of the warpage of the fiber-reinforced plastic after molding at room temperature. The warpage can be reduced by changing the progress of curing according to a part in the member, uniforming the temperatures as a whole by considering the heat generation during curing of the resin and the like. It is preferable that the temperature condition is designed by the calculation which is capable of realizing the reduction of the warpage.

It is also preferable that quantities of state of the fiber-reinforced material are measured while the fiber-reinforced material is heated or cooled during molding and the temperature condition of the molding is calculated based on the measured quantities of state. For example, the residual stress during molding that accumulates internally may be predicted by a simulation based on a database of cure kinetics parameters and a thermal conductivity, a thermal contraction and a curing contraction as well as viscoelastic characteristics of a thermosetting resin collected in advance to predict the warpage of a molded product. In addition, the temperature condition to suppress the warpage may be calculated based on a measured value obtained by directly measuring an internal strain by using an optical fiber sensor and the like during molding. Examples of the quantities of state suitable for monitoring include a temperature, a degree of cure, a strain, a degree of impregnation of the resin and the like. Since molding is performed under an atmospheric pressure, the quantities of state are easily measured from the outside even during molding. It is possible to measure the temperature by a thermocouple, a non-contact thermometer and the like to measure the degree of cure by measuring a permittivity using a high frequency current and the like, and to measure the degree of impregnation of the resin by performing ultrasonic measurement, a thickness measurement and the like. In addition, the temperature, the degree of cure, the strain and the resin-impregnated parts may be measured by embedding an optical fiber sensor and the like internally.

In addition, it is preferable that, for a fiber-reinforced material which has a thickness distribution, a temperature at an approximately central part in the thickness direction of the maximum thickness portion, which is Ta [° C.], is measured and the temperature condition of the contact heat source is determined such that a temperature at the minimum thickness portion, which is Tb [° C.], satisfies: Ta−5° C.<Tb<Ta+5° C. There is a high possibility that a central part in the thickness direction of the maximum thickness portion has the highest temperature due to the reaction heat of the thermosetting resin and, therefore, the temperature at an approximately central part is monitored, and the temperature condition at the minimum thickness portion is determined such that the temperature at the minimum thickness portion is about the same as the temperature at the approximately central part of the maximum thickness portion. According to this, the temperature histories become about the same over the whole parts of the molded product and, therefore, it is possible to mold a fiber-reinforced plastic which is uniform in mechanical properties. As a result, the manufacturing which allows less dispersion among products having stable quality becomes possible. Meanwhile, the phrase "an approximately central part in the thickness direction" refers to a range of thickness of ±0.1 from the center of the thickness taking the thickness of the portion as 1.

It is more preferable that the temperature condition of the molding is made to change in a direction to eliminate the gap between the predicted value, which is obtained by the simulation of the quantities of state of the fiber-reinforced material during molding or the like, and the measured value, obtained by monitoring. A product can be produced under the molding condition as predicted by performing the heat transfer analysis and solving the balance of the forces to predict the warpage and the like such that the state during molding is predicted and, at the same time, by comparing the predicted value and the measured value actually obtained by using a sensor which is located outside of the molded product or is embedded into the inside of the molded product, and by changing the temperature condition of the molding such that the gap between the predicted value and the measured value is eliminated.

In addition, it is preferable that a temperature capable of holding a viscosity of the thermosetting resin composition of 10 Pa·s or lower for 90 minutes or longer is held, a degree of impregnation of the thermosetting resin composition into the fiber-reinforced material is measured, and temperature rising is performed at a stage where the impregnation is completed. When using some types of fiber-reinforced materials, the time for holding the resin in a state where the resin has a low viscosity so that the resin is impregnated completely during molding to eliminate voids is provided. In particular, in atmospheric pressure molding, it is preferable that heat retention is performed at a temperature capable of holding a viscosity of the resin of 10 Pa·s or lower for 90 minutes or longer because it is required that the resin is kept in a state of a low viscosity for a long period of time due to the low pressurization for impregnation. When the fiber-reinforced material is highly ununiform, the impregnation time varies every time. In such a case, to realize the molding without causing voids under the same molding condition in every time, the impregnation time considering a safety factor is required and, as a result, the time for molding is relatively long. On the other hand, when the degree of impregnation is actually measured, the temperature rising can be started at a stage where the impregnation is completed, gellation and then curing can proceed, and the time for molding can be reduced. Further, when the degree of impregnation is actually measured, the absence of voids can be ensured during molding, but not after molding. Examples of the method of measuring the degree of impregnation of a thermosetting resin composition into a fiber-reinforced material include a method comprising measuring a change in a thickness or a change in a dielectric constant, a method comprising confirming reaching of the resin by using an optical fiber sensor and the like. Meanwhile, a viscosity is measured by a dynamic viscoelasticity measuring device using parallel plates, with a distortion of 100%, a frequency of 0.5 Hz, an interval between the plates of 1 mm, while performing simple temperature rising at a speed of 2° C./min from 50° C. to 170° C.

It is preferable to use a partially impregnated prepreg having a first layer comprising at least the reinforcing fiber and a second layer comprising the reinforcing fiber impregnated with the thermosetting resin composition and having a degree of impregnation of the thermosetting resin composition into the fiber-reinforced material of 10 to 90 volume %, as the fiber-reinforced material comprising the reinforcing fiber impregnated with the thermosetting resin composition. In addition, it is preferable that the partially impregnated prepregs are laminated before heating. In the molding in an atmospheric pressure, the air trapped during lamination and volatile components from a prepreg are difficult to be discharged to the outside of the prepreg during molding, which causes generation of voids, though generation of voids is hardly to be a problem in a conventional molding method under high pressure using an autoclave and the like. Accordingly, by making the thermosetting resin composition be partially impregnated into the fiber-reinforced material, an unimpregnated part of the reinforcing fiber within the prepreg behaves as an air flow passage, and air and volatile components from the prepreg become easily discharged. On the other hand, when the degree of impregnation is too low, separation occurs between the reinforcing fiber and the thermosetting resin composition, and tackiness of the prepreg becomes too strong, which results in problems that workability during lamination of the prepregs is inferior and the relatively long impregnation time is required to be secured during molding, and the like. Accordingly, there is a suitable range of the degree of impregnation, and it is better that the degree of impregnation is 10 to 90 volume %. The degree of impregnation is preferably 20 to 70 volume %, and is more preferably 20 to 50 volume %. In this regard, the degree of impregnation of a thermosetting resin composition in a prepreg can be calculated by curing the prepreg gradually at a low temperature at which no resin flow is generated, observing a cross section after curing with a microscope, and obtaining the ratio of the cross-section area of the thermosetting resin composition impregnated among the reinforcing fibers to the total cross-section area of the space among the reinforcing fibers.

It is preferable that the partially impregnated prepreg has the second layers on both sides of the first layer, the second layer has a layer A which comprises the reinforcing fiber impregnated with the thermosetting resin composition and a layer B which includes a particle or a fiber of a thermoplastic resin, and the layer B is placed on the surface of the partially impregnated prepreg. According to this aspect, in the fiber-reinforced plastic molded by laminating prepregs, the layer B makes it possible to form an interlayer resin layer between the reinforcing fiber layers of each layer. As a result, when an impact load is applied to the fiber-reinforced plastic from the outside, cracks are induced to the flexible interlayer resin layer. Since the thermoplastic resin is present in a place to which the cracks are induced, the progress of cracks is stopped due to the high toughness of the thermoplastic resin, and the separation is suppressed, which results in high remaining compressive strength after the impact from the outside. Accordingly, the fiber-reinforced plastic becomes advantageous in designing the structures of aircrafts and the like.

In addition, it is more preferable that the thickness of a laminate obtained by laminating the partially impregnated prepregs is thicker by 5 to 50% than a thickness of the fiber-reinforced plastic after curing. The difference between the thickness of the laminate of prepregs and the thickness of the fiber-reinforced plastic after curing corresponds to internal space and is an index of the degree of easiness of the discharge of air and volatile components from a prepreg. When the size of the internal space is not large to a certain extent, the discharge tends to be difficult and, therefore, voids tend to remain easily. On the other hand, when the size of internal space is too large, the impregnation of the resin tends not to be completed during molding. Furthermore, the laminate of prepregs formed to have a three-dimensional shape is not capable of following the shape as the thickness of the laminate of prepregs decreases due to the collapse of the internal space during molding, and as a result, wrinkles are easily generated. Accordingly, a preferable change in the thickness is 5 to 50% expressed by a ratio of the thickness of the laminate to the thickness of the fiber-reinforced plastic after curing. More preferably, the change in the thickness is 15 to 30%. A thickness of a laminate obtained by laminating the partially impregnated prepregs refers to the thickness immediately before molding and the thickness of the laminate is measured in a state where the laminate is set in a mold and is evacuated.

The reinforcing fiber may be a glass fiber, Kevlar fiber, a carbon fiber, a graphite fiber, a boron fiber or the like. Among them, the carbon fiber is preferable from the viewpoints of a specific strength and a specific elastic modulus. Examples of the shape or the orientation of the reinforcing fiber include long fibers aligned in one direction, a bidirectional woven fabric, a multiaxial woven fabric, a nonwoven fabric material, a mat, a knitted fabric, a braid and the like. They may be freely chosen depending on the use and the field of application.

The thermosetting resin contained in the thermosetting resin composition is not particularly limited as long as the thermosetting resin undergoes a crosslinking reaction by being heated and forms at least a partially crosslinked three-dimensional structure. Examples of these thermosetting resins include an unsaturated polyester resin, a vinyl ester resin, an epoxy resin, a benzoxazine resin, a phenol resin, a urea resin, a melamine resin, a polyimide resin and the like. A resin obtained by blending two or more types of these resins may also be used. In addition, the above-described thermosetting resin may be a self-curing resin which is self-cured by being heated and may be used in combination with a curing agent, a cure-promoting agent and the like.

Among these thermosetting resins, an epoxy resin is preferably used because of the excellent balance among heat resistance, mechanical properties and adhesion to a carbon fiber. In particular, an epoxy resin which is obtained from a precursor which is an amine compound, a phenol compound or a compound bearing a carbon-carbon double bond is preferably used. Specifically, an aminophenol-type epoxy resin, a glycidyl aniline-type epoxy resin and a tetraglycidylamine-type epoxy resin, each of which is obtained from an amine compound as a precursor, are preferably used. Examples of the glycidylamine-type epoxy resin include tetraglycidyl diaminodiphenyl, triglycidyl-p-aminophenol, triglycidyl amino creosol and the like. A tetraglycidylamine-type epoxy resin which is a high-purity tetraglycidylamine-type epoxy resin and which has an average epoxide equivalent weight (EEW) of 100 to 115 and an aminophenol-type epoxy resin which is a high-purity aminophenol-type epoxy resin and having an average EEW of 90 to 104 are preferably used because they suppress volatile components which may cause generation of voids in the obtained fiber-reinforced composite materials. Tetraglycidyl diaminodiphenyl methane is excellent in heat resistance and is preferably used as a resin for a composite material of structural members for aircrafts.

In addition, a glycidyl ether-type epoxy resin obtained by using a phenol compound as a precursor is also preferably used as the thermosetting resin. Among these epoxy resins, examples include a bisphenol A-type epoxy resin, a bisphenol F-type epoxy resin, a bisphenol S-type epoxy resin, a phenol novolac type epoxy resin, a creosol novolac type epoxy resin and a resorcinol type epoxy resin. A bisphenol A-type epoxy resin which is a high-purity bisphenol A-type epoxy resin and having an average EEW of 170 to 180 and a bisphenol F-type epoxy resin which is a high-purity bisphenol F-type epoxy resin and having an average EEW of 150 to 65 are preferably used because they suppress volatile components which may cause generation of voids in the obtained fiber-reinforced composite materials.

With regard to a liquid bisphenol A-type epoxy resin, a bisphenol F-type epoxy resin and a resorcinol type epoxy resin, it is preferable that each of them is used in combination with another epoxy resin because the viscosity of each of them is low.

In addition, a bisphenol A-type epoxy resin existing as a solid at room temperature (about 25° C.) takes a structure in which a crosslinking density in the cured resin is lower compared to a crosslinking density in a structure taken by a bisphenol A-type epoxy resin existing as a liquid at room temperature (about 25° C.). Accordingly, the cured resin of the bisphenol A-type epoxy resin existing as a solid at room temperature (about 25° C.) exhibits lower heat resistance but higher toughness and, therefore, it is preferable that the bisphenol A-type epoxy resin existing as a solid at room temperature (about 25° C.) is used in combination with a glycidylamine-type epoxy resin, a liquid bisphenol A-type epoxy resin and a bisphenol F-type epoxy resin.

An epoxy resin having a naphthalene skeleton gives a cured resin with high heat resistance. In addition, a biphenyl type epoxy resin, a dicyclopentadiene type epoxy resin, a phenolaralkyl type epoxy resin and a phenyl fluorine type epoxy resin may also be preferably used.

A urethane-modified epoxy resin and an isocyanate-modified epoxy resin are preferably used because each of them gives a cured resin having high fracture toughness and high elongation.

The above-described epoxy resin may be used alone or two or more kinds of these epoxy resins may be used in combination, as needed. It is preferable that a bifunctional epoxy resin, a trifunctional epoxy resin or a multifunctional epoxy resin having more than three functional groups is added because the resin obtained by adding the multifunctional epoxy resin having at least two functional groups is easy to handle as a prepreg and is easy to be processed when being processed to a resin film for impregnation. The addition of the multifunctional epoxy resin having at least two functional groups is also preferable because the epoxy resin is capable of providing a fiber-reinforced composite having heat resistance under a wet condition. In particular, the combined use of a glycidylamine-type epoxy resin and a glycidyl ether-type epoxy resin is capable of achieving high processability, high heat resistance and high water resistance. In addition, the use of at least one kind of epoxy resin existing as a liquid at room temperature and at least one kind of epoxy resin existing as a solid at room temperature in combination is effective for giving both a suitable tackiness and a suitable drape property to a prepreg.

A phenol novolac type epoxy resin and a creosol novolac type epoxy resin give a cured resin having high heat resistance and high water resistance. The use of the phenol novolac type epoxy resin and the creosol novolac type epoxy resin is capable of improving heat resistance and water resistance as well as of regulating a tackiness and a drape property of a prepreg.

A curing agent for an epoxy resin may be any compound as long as the compound has an active group which is capable of reacting with an epoxy group. A compound having an amino group, an acid anhydride group or an azide group is suitable as the curing agent. More specific examples of the curing agent include each of various kinds of isomers of dicyandiamide, diaminodiphenylmethane and diaminodiphenylsulfone, aminobenzoates, each of various kinds of acid anhydrides, a phenol novolac resin, a cresol novolac resin, a polyphenol compound, an imidazole derivative, an aliphatic amine, tetramethylguanidine, a thiourea added amine, methylhexahydrophthalic anhydride, other carboxylic acid anhydrides, a carboxylic acid hydrazide, a carboxylic acid amide, a polymercaptan, boron trifluoride ethylamine complex and other Lewis acid complexes and the like. The above-described curing agent may be used alone or two or more kinds of them may be used in combination.

Use of an aromatic diamine as the curing agent is capable of providing a cured resin having good heat resistance. In particular, use of each of various kinds of isomers of diaminodiphenylsulfone is most suitable because use of an isomer of diaminodiphenylsulfone is capable of providing a cured resin having excellent heat resistance. It is preferable that the additive amount of an aromatic diamine which is the curing agent is stoichiometrically equivalent to the amount of an epoxy group in a resin. However, in some cases, by making the additive amount of an aromatic diamine be about 0.7 to about 0.9 expressed by an equivalence ratio to the amount of an epoxy group, a cured resin with a high elastic modulus can be obtained.

In addition, the combined use of imidazole or dicyandiamide and a urea compound (for example, 3-phenol-1,1-dimethylurea, 3-(3-chlorophenyl)-1,1-dimethylurea, 3-(3,4-dichlorophenyl)-1,1-dimethylurea, 2,4-toluenebisdimethylurea, 2,6-toluenebisdimethylurea) as the curing agent makes it possible that high heat resistance and high water resistance are achieved even though curing is performed at a relatively low temperature. Further, the use of a substance having a possibility of forming one of these curing agents, for example, use of a microencapsulated substance, makes it possible to increase preservation stability of a prepreg. In particular, due to use of such a substance, a tackiness and a drape property become hard to change even when being left at room temperature.

In addition, the above-described epoxy resin and the curing agent or a product obtained by making the above-described epoxy resin and the curing agent undergo a preliminary reaction partially may be added to a composition. In some cases, this process is effective in regulating a viscosity and improving preservation stability.

In the thermosetting resin composition used as a matrix, it is preferable that a thermoplastic resin is mixed with the above-described thermosetting resin and is dissolved in the thermosetting resin beforehand. It is preferable that the above-described thermoplastic resin is normally a thermoplastic resin which has a bond selected from a carbon-carbon bond, an amide bond, an imide bond, an ester bond, an ether bond, a carbonate bond, a urethane bond, a thioether bond, a sulfone bond and a carbonyl bond. However, the above-described thermoplastic resin may have a partially cross-linked structure.

In addition, the thermoplastic resin may or may not have a crystalline property. In particular, it is preferable that at least one kind of the resin selected from the group consisting of a polyamide, a polycarbonate, a polyacetal, a polyphenylene oxide, a polyphenylene sulfide, a polyarylate, a polyester, a polyamideimide, a polyimide, a polyether imide, a polyimide having a phenyl trimethyl indane structure, a polysulfone, a polyether sulfone, a polyether ketone, a polyether ether ketone, a polyaramide, a polyether nitrile and a polybenzimidazole is blended with the thermosetting resin and is dissolved in the thermosetting resin.

The above-described thermoplastic resin may be a commercially available polymer or may be a so-called "oligomer" having a molecular weight lower than the molecular weight of the commercially available polymer. As the oligomer, an oligomer which has a functional group which is capable of reacting with the thermosetting resin at a terminal or in a molecule chain is preferable.

When a mixture of the thermosetting resin and the thermoplastic resin is used as a matrix, the result becomes better than when only one of the thermosetting resin and the thermoplastic resin is used. Use of the mixture of the thermosetting resin and the thermoplastic resin makes it possible that fragility of the thermosetting resin is covered by toughness of the thermoplastic resin and difficulty in molding of the thermoplastic resin is covered by the thermosetting resin. Accordingly, the mixture of the thermosetting resin and the thermoplastic resin can be used as a well-balanced base compound. The ratio (parts by mass) of the thermosetting resin to the thermoplastic resin is preferably 100:2 to 100:50 (the thermosetting resin: the thermoplastic resin), and is more preferably 100:5 to 100:35, from the viewpoint of the balance of each of the above-described characteristics.

Preferably, there is a particle or a fiber of the thermoplastic resin in the layer B and, therefore, excellent impact resistance can be realized. The material for the particle or the fiber of the thermoplastic resin may be the same as each of various kinds of thermoplastic resins which is described above as the thermoplastic resin to be blended with and dissolved in the thermosetting resin. Among the thermoplastic resins described above, a polyamide is most preferable because the polyamide largely improves impact resistance due to the excellent toughness. Among polyamides, nylon 12, nylon 6, nylon 11 and nylon 6/12 copolymer as well as a nylon converted to a semi-IPN (an Interpenetrating Polymer Network structure) by an epoxy compound (a semi-IPN nylon) which is described in Example 1 of Japanese Unexamined Patent Application Publication No. Hei 01-104624 (as the corresponding literature, reference is made to Publication of European Patent Application No. 274,899, Example 8) are particularly excellent in adhesive strength to the thermosetting resin. Accordingly, it is preferable to use the above-described polyamides because the separation strength between the layers of the fiber-reinforced composite material at the time of the falling weight impact becomes higher and an enhancing effect on the impact resistance becomes higher.

When a particle of a thermoplastic resin is used, the shape of the particle of the thermoplastic resin may be any of a spherical shape, a nonspherical shape, a porous shape, a needle shape, a whisker shape and a flake shape, but a spherical shape is preferable because a fiber-reinforced composite material having high impact resistance can be obtained due to the following reasons. When using the thermoplastic resin of a spherical shape, flow properties of a flow of the thermosetting resin do not decrease and, therefore, an impregnation property into the reinforcing fiber becomes excellent. In addition, in using the thermoplastic resin of a spherical shape, the separation between layers of the fiber-reinforced composite material generated at the time of the falling weight impact (or at the time of the local impact) decreases further and, therefore, a frangible region that becomes a starting point for destruction due to the stress concentration when a further force is exerted on the fiber-reinforced composite material after the impact becomes smaller.

When a fiber of a thermoplastic resin is used, the shape of the fiber of the thermoplastic resin may be either a short fiber or a long fiber. In a short fiber, it is possible to employ a method which comprises using the fiber in a manner similar to the particle, as described in Japanese Unexamined Patent Application Publication No. Hei 02-69566 (Publication of European Patent Application No. 351,026) or a method which comprises processing the short fiber into a mat. In a long fiber, it is possible to employ a method which comprises arranging the long fibers in parallel on a surface of a prepreg, as described in the publication of Japanese Patent No. 3065686 or a method which comprises arranging the long fibers at random as described in WO 94/016003. In addition, the fiber can be processed into a woven fabric as described in the publication of Japanese Patent No. 3065686, or the fiber can be used as a sheet type material for a nonwoven fabric material, a knitted fabric or the like as described in WO 94/016003 (Publication of European Patent Application No. 632,087). Further, it is possible to employ a method comprising spinning short fiber chips, chopped strands, milled fibers and the short fibers into yarns and, thereafter, arranging the yarns in parallel or at random to form a woven fabric, a knitted fabric and the like.

EXAMPLES

Our process is described more specifically hereinbelow, by referring to Examples in which a heat transfer analysis which considers cure kinetics parameters of a thermosetting resin is used, but this disclosure is not limited by the Examples. The procedure of the heat transfer analysis is as follows.

To demonstrate effects of the process, a two-dimensional heat transfer equation of a fixed object represented by Formula (1) was used, and a temperature change within an object was calculated by a finite difference method with time stepping.

$$\rho C_p \frac{\partial T}{\partial t} = \frac{\partial}{\partial x}\left(k_x \frac{\partial T}{\partial x}\right) + \frac{\partial}{\partial y}\left(k_y \frac{\partial T}{\partial y}\right) + Q \qquad (1)$$

Wherein, $\rho$ is a density (kg/m$^3$) of a fiber-reinforced plastic, $C_p$ is a specific heat (J/kg·K) of a fiber-reinforced plastic and k is a thermal conductivity (W/m·K) of a fiber-reinforced plastic and is different in values between that of an in-plane direction and that of a thickness direction since a fiber-reinforced plastic exhibits an anisotropy. In addition, the thermal conductivity is considered to be a constant value due to the small temperature dependence. The t is a time (sec), T is a temperature (° C.), Q is the heat generation (W/m$^3$) accompanying a curing reaction of a resin, and x and y are Cartesian coordinates in a two-dimensional space.

Each of the density, specific heat and thermal conductivity is a physical property value of the material of each of the fiber-reinforced plastic and a single-sided mold. The heat generation can be represented by Formula (2), taking a degree of cure of a resin as $\alpha$.

$$Q = \rho_m(1 - V_f)H\frac{\partial \alpha}{\partial t} \qquad (2)$$

Wherein, $\rho_m$ is a density of a resin, Vf is a volume fraction of fibers, and the relation to a mass ratio of a resin Rc can be expressed by Formula (3).

$$\frac{\rho_m(1 - V_f)}{\rho} = R_c \qquad (3)$$

H is a heat of reaction due to curing of a resin (J/kg), which is, together with a curing rate of a resin, calculated by differential scanning calorimetry (DSC).

The curing rate of a resin is modeled as a function of temperature and degree of cure from measured results of DSC. The heat of reaction due to curing of the resin can be obtained from an area of a portion corresponding to the heat generation from measured results of DSC, and the curing rate can be obtained by dividing a height of a portion corresponding to the heat generation by a heat of reaction due to curing, respectively. Formulae (4) and (5) were used in the present Examples.

$$\frac{\partial \alpha}{\partial t}(K_1 + K_2\alpha^m)(1 - \alpha)^n \qquad (4)$$

$$K_i = A_i \exp\left(-\frac{E_i}{RT}\right) (i = 1, 2) \qquad (5)$$

A temperature T in Formula (5) is expressed as an absolute temperature (K) and R is a gas constant (8.31 J/K·mol). A, E, m and n are parameters specific to a resin which can most closely reproduce measured results by using a model. Formula (5) is Arrhenius equation, wherein A is a so-called frequency factor and E is a so-called activation energy.

At a boundary which contacts with air, a plate heater or the like which acts as a boundary condition of temperatures, terms in the right-hand side of Formula (1) which uses a thermal conductivity is replaced with the transfer of heat which uses a heat transfer coefficient as expressed in Formula (6).

$$k_x \frac{\partial T}{\partial x} \to h(T_{out} - T) \qquad (6)$$

Wherein, h is a heat transfer coefficient (W/m²·K), $T_{out}$ is an external temperature (a temperature of air, a plate heater or the like) which acts as a boundary condition.

The thermosetting resin composition was obtained by mixing a liquid bisphenol A epoxy resin jER 828 (Mitsubishi Chemical Corporation), 4,4'-diaminodiphenylsulfone "SEIKACURE" S (Wakayama Seika Kogyo Co., Ltd.) and a polyethersulfone "SUMIKAEXCEL" (registered trademark) 5003P (Sumitomo Chemical Co., Ltd.) in the ratio of 100:33:15 parts by mass, respectively. A heat of reaction due to curing, that is H, as well as a relation of a curing rate to a temperature and a degree of cure were obtained by DSC. Specifically, measurements with temperature rising were performed at 2, 5, 10, 15 and 20° C./min, and measurements at constant temperatures were performed at 150, 170 and 190° C. Then, heat fluxes were compared to Formulae (4) and (5), and A, E, m and n, which made the difference between the total measurement data and modeled data minimum, were determined by using a least-squares method. The determined A, E, m and n are shown in Table 1.

TABLE 1

| Mass ratio of resin Rc | 35% |
|---|---|
| Heat of reaction due to curing H (J/kg) | 472,000 |
| $A_1$ (1/sec) | 386,000 |
| $E_1$ (J/mol) | 76,600 |
| $A_2$ (1/sec) | 4.85 |
| $E_2$ (J/mol) | 28,400 |
| m (—) | 2.48 |
| n (—) | 1.59 |

In addition, in each of Examples 1 to 4 and Comparative Examples 1 to 3, a simulation of molding a laminate was performed by using the laminate obtained by using a quasi-isotropic laminate method of laminating prepregs in which the thermosetting resin composition was impregnated into a carbon fiber at a ratio of Rc=35%. Meanwhile, with regard to a density, specific heat and thermal conductivity of each of a fiber-reinforced plastic and a single-sided mold, reference was made to values described in literature (authored by C. T. Pan and H. Hocheng, Composites Part A, Vol. 32 (2001), pages 1657-1667) which are shown in Table 2.

TABLE 2

| | Fiber-reinforced plastic | Single-sided mold |
|---|---|---|
| Density (kg/m³) | 1,530 | 2,700 |
| Specific heat (J/kg · K) | 950 | 960 |
| Thermal conductivity (W/m · K) | In-plane direction: 2.77 Out-plane direction: 0.67 | 130 |

With regard to heat transfer coefficients, a heat transfer coefficient between air and the fiber-reinforced material or the single-sided mold was set to 5 W/m²·K in all cases, and a heat transfer coefficient between a contact heat source and the fiber-reinforced material was set to 500 W/m²·K in all cases.

Each of Examples is described hereinbelow. In FIGS. 4A-4C, FIGS. 6A and 6B and FIGS. 8A and 8B, the expression "Temperature" means the temperature and the expression "Degree of Cure" means the degree of cure.

Example 1

Figures 3A, 3B, 3C:
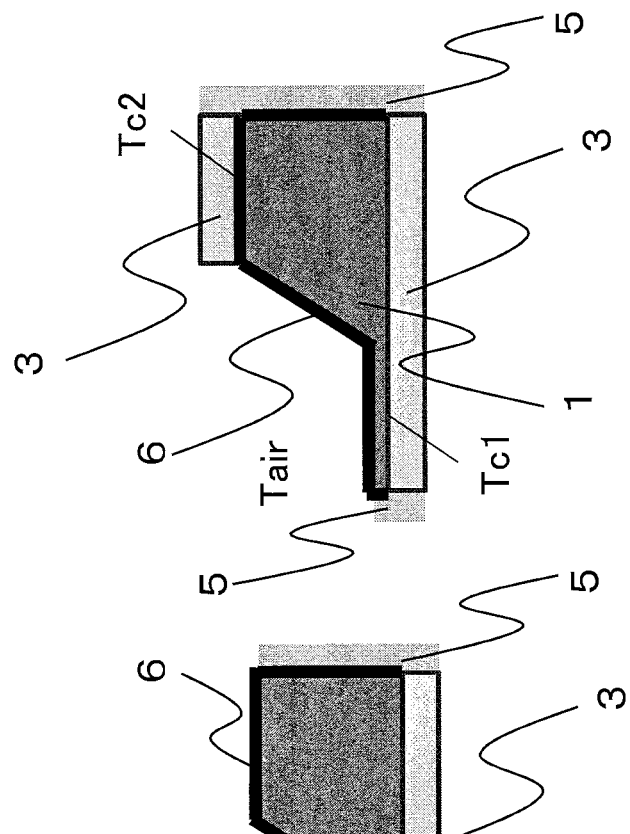
FIG. 3A is a schematic diagram showing an example of a conventional molding method by oven heating.
FIG. 3B is a schematic diagram showing an example of the molding which utilizes an atmospheric-pressure and ambient-temperature atmosphere as a cooling source.
FIG. 3C is a schematic diagram showing an example of the molding which uses local contact heating. Each figure is a sectional view.

A fiber-reinforced material which is a laminate of prepregs with a ply drop as shown in FIG. 3B was molded by contact heating. A plate heater was placed as a contact heat source of uniform temperature 3 on the lower surface of a fiber-reinforced material 1, and a bagging film 6 placed on the fiber-reinforced material 1. Then, suction was performed with a vacuum pump. Temperature control was conducted only from the lower surface, and the upper surface made to contact an atmospheric-pressure and ambient-temperature atmosphere indirectly through the bagging film 6 such that the atmospheric-pressure and ambient-temperature atmosphere acted as a cooling source.

Figure 4C:
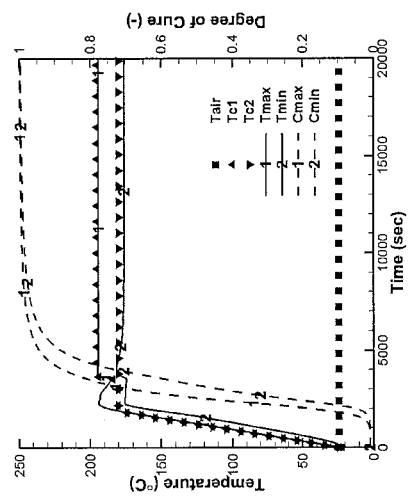
FIG. 4C is a graph showing a time course of a controlled temperature and a temperature in a fiber-reinforced material by the local contact heating.
Figure 4B:
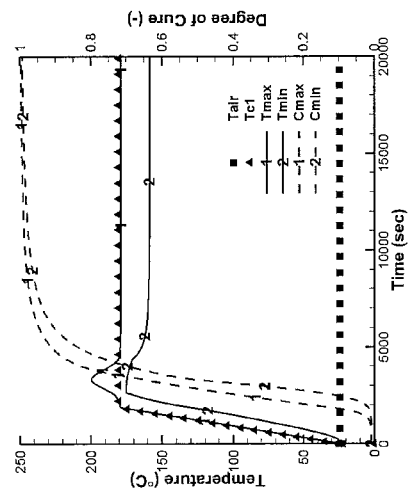
FIG. 4B is a graph showing a time course of a controlled temperature and a temperature in a fiber-reinforced material when an atmospheric-pressure and ambient-temperature atmosphere is used as a cooling source.

In FIG. 4B, Tc1 [° C.] represents the controlled temperature of the plate heater at the lower surface. In addition, Tmax and Tmin represent the maximum temperature and the minimum temperature in the material, Cmax and Cmin represent the maximum degree of cure and the minimum degree of cure in the material, respectively (the same is applied to the followings). Tc1 of the lower surface plate heater which was in contact with the fiber-reinforced material was subjected to temperature rising from room temperature of 24° C. to 180° C. at a speed of 5.0° C./min, and when the Tc1 reached 180° C., the temperature was held.

The maximum value of the temperature of the fiber-reinforced material did not exceed 200° C., and it was possible that molding was performed in a range of curing temperatures that enabled stable expression of physical properties of the thermosetting resin composition. In addition, the time when degrees of cure exceeded 95% in all parts of the fiber-reinforced material was after 7,760 seconds, and the molding cycle time was reduced by nearly half compared to oven heating according to Comparative Example 1. It was possible that an overshoot was suppressed by using the atmospheric-pressure and ambient-temperature atmosphere as the cooling source. It was also possible that the molding cycle time was reduced by using the plate heater which is a contact heat source having a better heat transfer property than air.

Example 2

A fiber-reinforced material which is a laminate of prepregs with a ply drop as shown in FIG. 3C was molded by contact heating. A bagging film 6 was placed on a fiber-reinforced material 1. Then, suction was performed with a vacuum pump. Two plate heaters were placed as contact heat sources of uniform temperature 3 on the upper surface and on the lower surface of the fiber-reinforced material, and temperature control conducted from each of the upper surface and the lower surface.

In FIG. 4C, Tc1 [° C.] represents the controlled temperature of the lower surface plate heater and Tc2 [° C.] represents the controlled temperature of the upper surface plate heater. Tc1 of the lower surface plate heater and Tc2 of the upper surface plate heater, in which both the plate heaters were in contact with the fiber-reinforced material, were both subjected to temperature rising from room temperature of 24° C. to 180° C. at a speed of 5.0° C./min, and when Tc1 reached 180° C., the temperature was held. At a time point of 3,500 seconds when an overshoot was levelled off, only Tc1 of the lower surface plate heater was further subjected to temperature rising at a speed of 5.0° C./min, and when the temperature reached 195° C., the temperature was held.

The maximum value of the temperature of the fiber-reinforced material did not exceed 200° C., and it was possible that molding was performed in a range of curing temperatures which enabled stable expression of physical properties of the thermosetting resin composition. In addition, the time when degrees of cure exceeded 95% in all parts of the fiber-reinforced material was after 6,470 seconds, and the molding cycle time was reduced by more than half compared to oven heating according to Comparative Example 1 and by 1,290 seconds compared to Example 1. The effect that the molding cycle time was reduced was brought about by that the upper surface of the maximum thickness portion, which was hardly warmed in Example 1, was heated by introducing the upper surface plate heater and by that curing of the minimum thickness portion and an inclination portion, which were hardly warmed due to the contact with air at room temperature, was promoted by raising the temperature Tc1 of the lower surface plate heater again.

Example 3

Figure 5A:
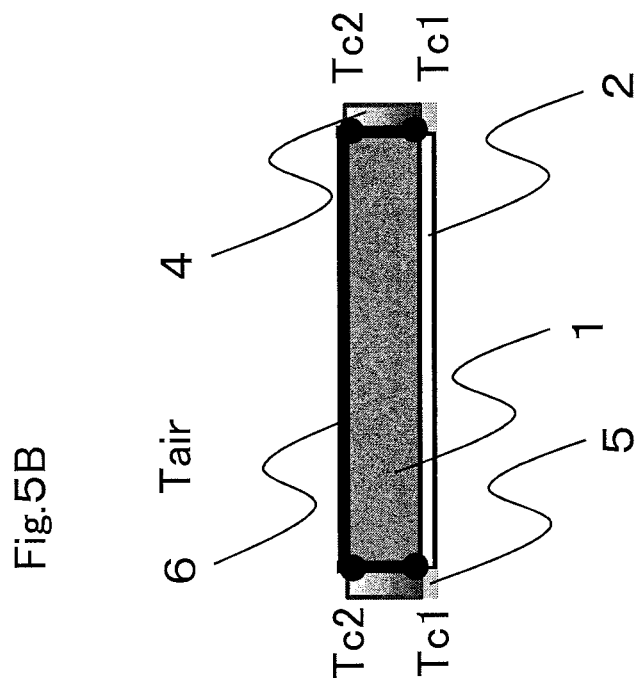
FIG. 5A is a schematic diagram showing an example of molding by a conventional oven heating method.
Figure 5B:
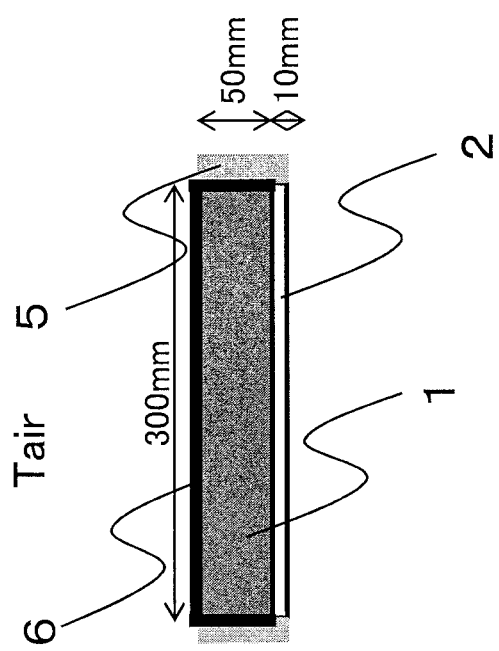
FIG. 5B is a schematic diagram showing an example of molding by using oven heating and local contact heating in combination. Each figure is a sectional view.

A fiber-reinforced material which is a laminate of prepregs and has a thickness of 50 mm and a width of 300 mm was placed on a single-sided mold made of aluminium which has a thickness of 10 mm as shown in FIG. 5B. A bagging film 6 was placed on a fiber-reinforced material 1. Then, suction was performed with a vacuum pump. Heating was performed by placing the fiber-reinforced material 1 in an oven as well as by pressing a heat source of non-uniform temperature 4 against an end part of the fiber-reinforced material 1 in which a plurality of discontinued parts of fibers were present. As a result, heat energy was transferred from the end part in an in-plane direction having a high thermal conductivity.

As shown in FIG. 6B, temperature rising by the oven was performed from room temperature of 24° C. at a speed of 1.5° C./min, and when the temperature reached 130° C., the temperature (Tair) was held to prevent the thermosetting resin composition from being adversely influenced by an overshoot due to the reaction heat. In addition, with regard to the heat source of non-uniform temperature 4 placed at the end part of the fiber-reinforced material, the temperatures were linearly distributed from the temperature Tc2 [° C.] at the upper end to the temperature Tc1 [° C.] at the lower end. With regard to the temperature Tc2 at the upper end, the temperature was raised from room temperature of 24° C. to 120° C. at a speed of 5.0° C./min and, thereafter, the temperature was held at 120° C. until 17,000 seconds at which an overshoot of the maximum temperature in the fiber-reinforced material 1 reached a peak and, thereafter, the temperature was raised to 190° C. at a speed of 0.25° C./min which was equal to the average temperature lowering speed of the overshoot and, thereafter, the temperature was held. With regard to the temperature Tc1 at the lower end, the temperature Tc1 was set such that Tc1 was constantly higher by 10° C. than Tc2. The overshoot due to the reaction heat was suppressed to 178.1° C. The overshoot was lowered by about 10° C. than that in Comparative Example 2 in which only oven heating was performed. In addition, the time when degrees of cure exceeded 95% in all parts of the fiber-reinforced material was after 25,125 seconds, and the molding cycle time was reduced by about half compared to the molding cycle time when heating was performed only by using an oven.

Example 4

Figure 7A:
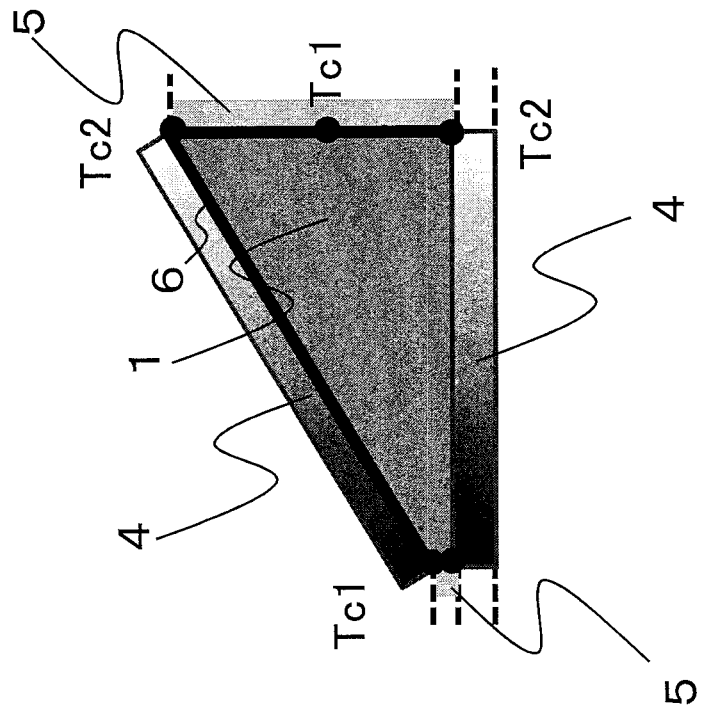
FIG. 7A is a schematic diagram showing an example of molding by a conventional oven heating method.
Figure 7B:
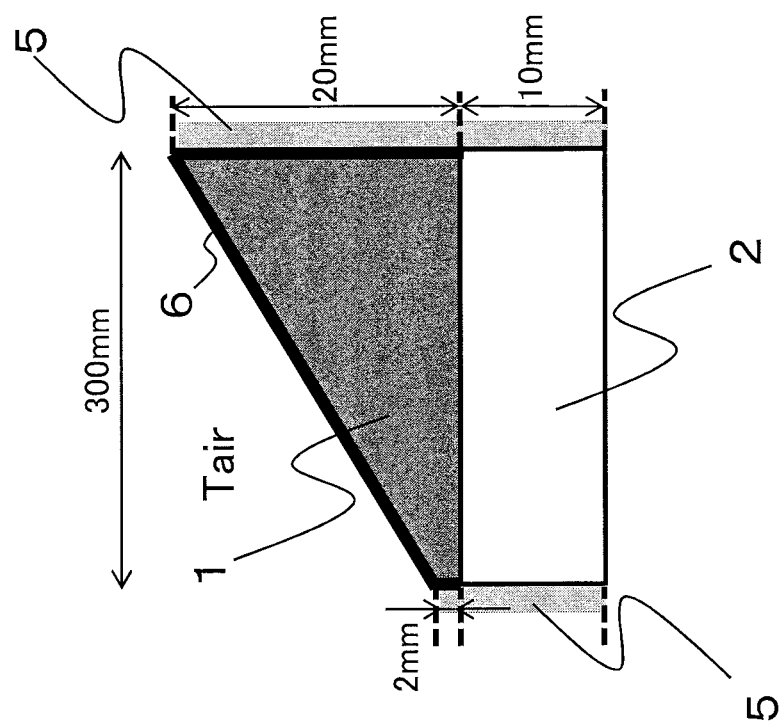
FIG. 7B is a schematic diagram showing an example of molding by the local contact heating. Each figure is a sectional view.

Heating was performed on a ply drop part of a fiber-reinforced material which is a laminate of prepregs and which has a thickness at the minimum thickness portion of 2 mm, a thickness at the maximum thickness portion of 20 mm and a width of 300 mm, as shown in FIG. 7B. A heat source of non-uniform temperature 4 was placed on the lower surface and a heat insulation material 5 was placed on each of the right and left sides and, thereafter, a laminate 1 of prepregs was placed. Then, a bagging film 6 was placed on the fiber-reinforced material, and suction performed with a vacuum pump. Thereafter, heating was performed by pressing a contact heat source of non-uniform temperature 4 through the bagging film 6. A simulation was performed by assuming that the laminate of prepregs was continued such that each of the thickness from the minimum thickness portion and that from the maximum thickness portion was the same.

Figure 8B:
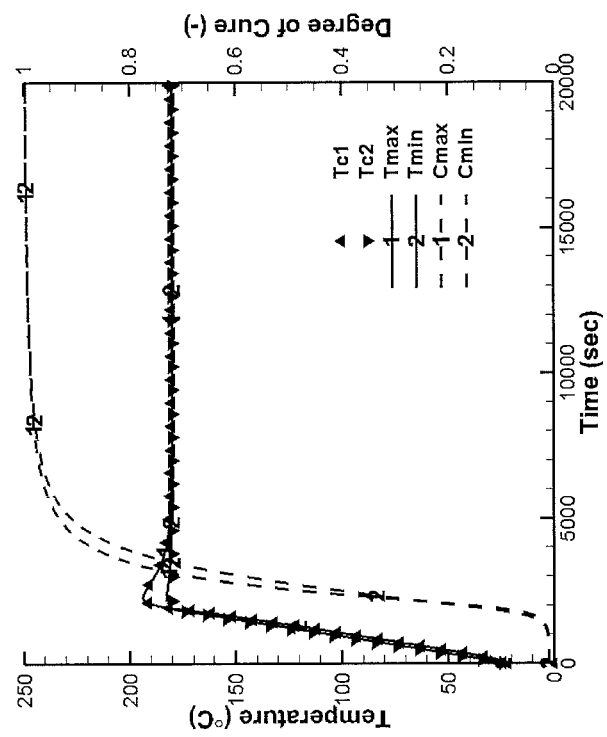
FIG. 8B is a graph showing a time course of a controlled temperature and a temperature in a fiber-reinforced material by the local contact heating.

A time course of the controlled temperature of the contact heat sources of non-uniform temperature 4 and the temperature in the fiber-reinforced material is shown in FIG. 8B. The temperature Tc2 of the right ends (the maximum thickness portion) of the contact heat sources of non-uniform temperature 4 on both the upper surface and the lower surface was raised from room temperature of 24° C. to 180° C. at a speed of 5° C./min, and was held at 180° C. When there is a dispersion of the time at which a degree of cure which causes the start of accumulation of a residual strain is reached within a member, the distribution of thermal residual stress tends to be difficult to predict, which causes generation of the warpage when the member becomes a product of a fiber-reinforced plastic. Accordingly, with regard to the temperature Tc1 at the left ends (the minimum thickness portion) as well as the temperatures between the left ends and the right ends of the contact heat sources of non-uniform temperature 4, which were placed on the upper surface and the lower surface, the following control was conducted such that the curing rates became uniform as much as possible.

(1) Detecting a temperature at the center in the thickness direction of the maximum thickness portion of the fiber-reinforced material during molding, and performing feedback such that the temperature at the center is provided as the temperature Tc1 [° C.] at the minimum thickness portion; and (2) changing the temperatures of the contact heat sources of non-uniform temperature 4 on the upper surface and the lower surface such that the temperature change from the temperature Tc1 at the minimum thickness portion to the temperature Tc2 at the maximum thickness portion becomes linear.

Figure 9A:
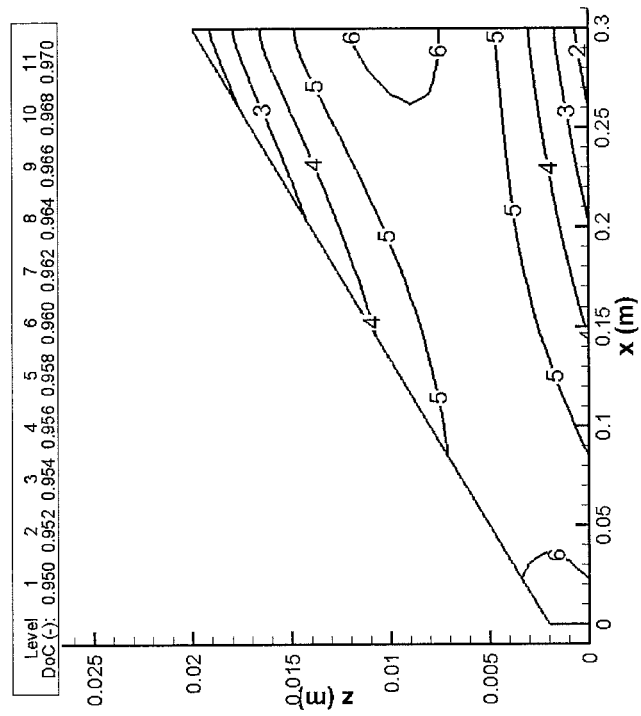
FIG. 9A is a contour diagram showing the distribution of degrees of cure in a fiber-reinforced material according to a conventional oven heating method.
Figure 9B:
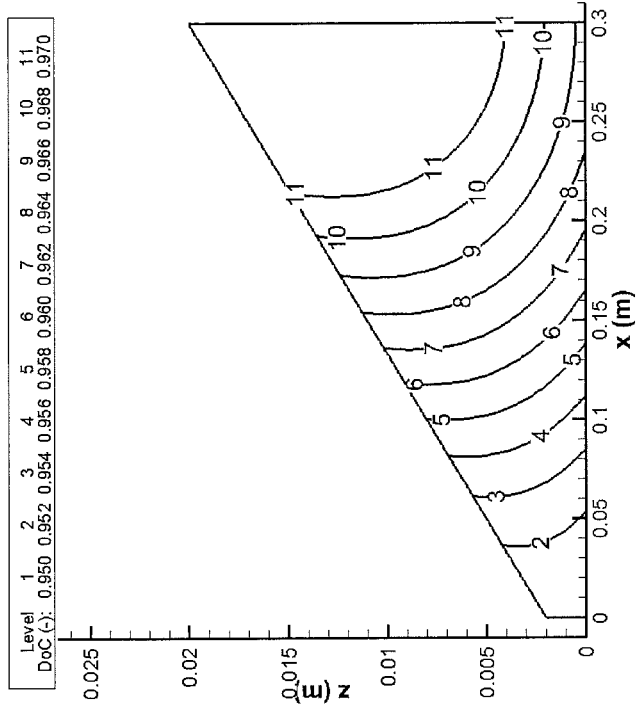
FIG. 9B is a contour diagram showing the distribution of degrees of cure in a fiber-reinforced material according to the local contact heating. A degree of cure means a progress degree of curing, and is a ratio of a heat generated accompanying the progress of curing to the heat of reaction generated by a curing reaction.

The maximum value of the temperature of the fiber-reinforced material did not exceed 200° C., and it was possible that molding was performed in a range of curing temperatures that enabled stable expression of physical properties of the thermosetting resin composition. In addition, the time when degrees of cure exceeded 95% in all parts of the fiber-reinforced material was after 6,090 seconds, and the molding cycle time was reduced by more than half compared to oven heating according to Comparative Example 3. Further, FIG. 9B shows the distribution of degrees of cure at the time when degrees of cure exceeded 95% in all parts of the fiber-reinforced material shown in FIGS. 7A and 7B. The horizontal axis "x" represents the horizontal direction and the vertical axis "z" represents the vertical direction. The figure is enlarged 10 times in the vertical axis to make it easier to understand. In the upper parts of FIGS. 9A and 9B, the amount of a degree of cure (DoC (Degree of Cure)) is expressed by levels from 1 to 11, and each of the levels is also shown in each of contour lines in FIGS. 9A and 9B. It can be understood that curing proceeded in this Example in a more uniform manner than in Comparative Example 3. It was possible that the nonuniformity of the temperature distribution was minimized in all the time steps and, as a result, distribution of degrees of cure was smoothed by performing the feedback such that the temperature at the maximum thickness portion which was predicted to increase most largely due to the reaction heat was provided as the controlled heating temperature of the minimum thickness portion.

Comparative Example 1

Figure 4A:
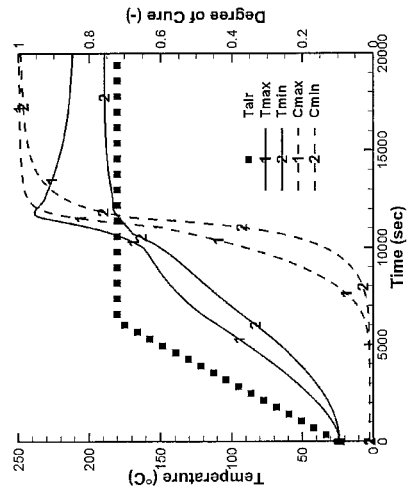
FIG. 4A is a graph showing a time course of a controlled temperature and a temperature in a fiber-reinforced material by a conventional oven heating method.

As shown in FIG. 3A, a fiber-reinforced material similar to those of Examples 1 and 2 was placed on a single-sided mold 2 which had a thickness of 10 mm and was made of aluminium. Then, a bagging film 6 was placed from the upper side. Then, suction was performed with a vacuum pump. After that, the molding was performed by oven heating. The temperature was raised from room temperature of 24° C. to 180° C. at a speed of 1.5° C./min. When the temperature reached 180° C., the temperature was held. FIG. 4A shows a time course of the controlled heating temperature by the oven "Tair" and the temperature in the fiber-reinforced material. An overshoot due to the reaction heat largely exceeded 200° C., the temperature at which the mechanical properties of the thermosetting resin composition were influenced, and reached 238.8° C. In addition, the time when degrees of cure exceeded 95% in all parts of the fiber-reinforced material was after 13,975 seconds, and the molding cycle time increased. Since the oven heating is performed by using air as a medium, heat transfer to the fiber-reinforced material and the single-sided mold tends to be inferior, and the fiber-reinforced material and the single-sided mold tend to be hardly warmed. In addition, when the overshoot was generated due to the reaction heat, the heat dissipation to air became slow. Further, the cooling efficiency was low since the air atmosphere itself was heated to 180° C. and, as a result, the overshoot became large.

Comparative Example 2

As shown in FIG. 5A, a fiber-reinforced material similar to that of Example 3 was placed on a single-sided mold which had a thickness of 10 mm and was made of aluminium. Then, a bagging film 6 was placed. The end parts of a fiber-reinforced material 1 were sealed with a sealant, which was made to be a heat insulation material 5. After that, the molding was performed by oven heating. The temperature increase was performed from room temperature of 24° C. at a speed of 1.5° C./min, and when the temperature reached 130° C., the temperature was held to prevent the thermosetting resin composition from being adversely influenced by an overshoot due to the reaction heat. FIG. 6A shows a time course of the controlled heating temperature by the oven "Tair" and the temperature in the fiber-reinforced material. The overshoot due to the reaction heat was suppressed to 187.7° C. On the other hand, the time when degrees of cure exceeded 95% in all parts of the fiber-reinforced material was after 45,355 seconds, and the molding cycle time increased very much.

Comparative Example 3

Figure 8A:
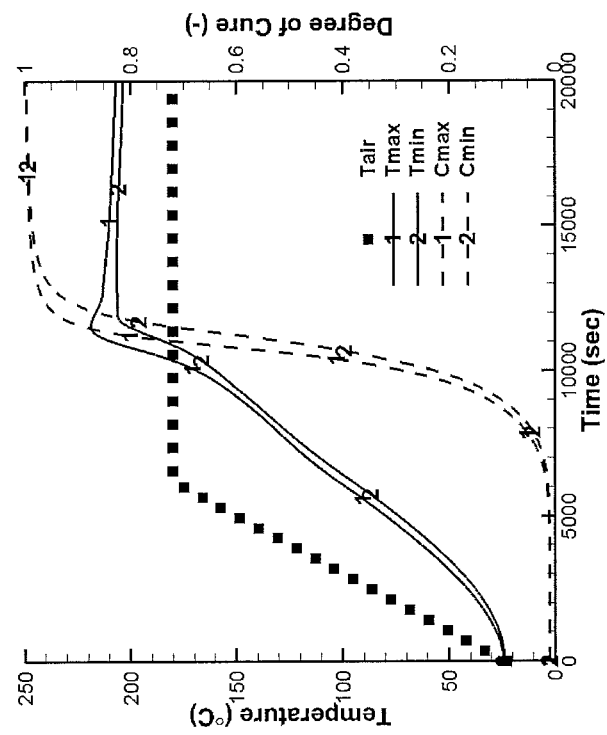
FIG. 8A is a graph showing a time course of a controlled temperature and a temperature in a fiber-reinforced material by a conventional oven heating method.

As shown in FIG. 7A, a fiber-reinforced material similar to that of Example 4 was placed on a single-sided mold 2 which had a thickness of 10 mm and was made of aluminium. Then, a bagging film 6 was placed and suction was performed with a vacuum pump. Thereafter, molding was performed by oven heating. The temperature was raised from room temperature of 24° C. at a speed of 1.5° C./min and when the temperature reached 180° C., the temperature was held. A simulation was performed by assuming that the laminate of prepregs was continued such that each of the thickness from the minimum thickness portion and that from the maximum thickness portion was the same and that each of the end parts was a boundary condition of the heat insulation. FIG. 8A shows a time course of the controlled heating temperature by the oven "Tair" and the temperature in the fiber-reinforced material. An overshoot due to the reaction heat exceeded 200° C., the temperature at which the mechanical properties of the thermosetting resin composition were influenced, and reached 218.5° C. In addition, the time when degrees of cure exceeded 95% in all parts of the fiber-reinforced material was after 12,945 seconds, and the molding cycle time increased. Further, FIG. 9A shows the distribution of degrees of cure at the time when degrees of cure exceeded 95% in all parts of the fiber-reinforced material. The remarkable tendency that the curing rate was high at a part near the upper surface of the maximum thickness portion and the curing rate was low at the minimum thickness portion was observed. Therefore, it was supposed that a non-uniform thermal residual stress was generated.

The invention claimed is:

1. A process of producing a fiber-reinforced plastic comprising:
   placing a fiber-reinforced material containing a reinforcing fiber impregnated with a thermosetting resin composition between a single-sided mold and a bagging film to form a closed space created by the single-sided mold and the bagging film;
   sucking the closed space with a vacuum pump to pressurize the fiber-reinforced material by utilizing a pressure difference from an atmospheric pressure;
   locally heating the fiber-reinforced material with a contact heat source under a temperature condition different from an atmosphere temperature in a state where the fiber-reinforced material is pressurized; and
   curing the fiber-reinforced material to mold the fiber-reinforced plastic,
   wherein the temperature condition is controlled to eliminate warpage of the obtained fiber-reinforced plastic by predicting strain of the fiber-reinforced material during molding by solving a balance of forces considering the thermal contraction and the curing contraction as well as the viscoelastic characteristics of the resin calculated based on a distribution of temperatures and degrees of cure predicted by the heat transfer analysis that includes cure kinetics parameters of the thermosetting resin.

2. The process according to claim 1, wherein the temperature condition given by the contact heat source is continuously changed.

3. The process according to claim 1, wherein at least a part of the fiber-reinforced material is contacted with an atmospheric-pressure and ambient-temperature atmosphere through the bagging film, and the atmospheric-pressure and ambient-temperature atmosphere is used as a cooling source.

4. The process according to claim 1, further comprising:
   performing heating by contacting the contact heat source with a part of a surface of the fiber-reinforced material that does not face the single-sided mold or with a part of the bagging film; or performing cooling by contacting a contact cooling source with a part of a surface of the fiber-reinforced material that does not face the single-sided mold or with a part of the bagging film.

5. The process according to claim 1, wherein the fiber-reinforced material has a thick portion and a thin portion, and, a temperature condition during molding is set such that the temperature rising rate of the thick portion is higher than the temperature rising rate of the thin portion at first and, thereafter, the temperature rising rate of the thick portion is lower than the temperature rising rate of the thin portion.

6. The process according to claim 1, wherein the temperature condition of the contact heat source is determined by a heat transfer analysis that includes cure kinetics parameters of a thermosetting resin under a constraint condition that the maximum temperature in the fiber-reinforced material does not exceed a predetermined temperature during molding.

7. The process according to claim 1, wherein the fiber-reinforced material has a discontinued part of the reinforcing fiber at an end part, and the end part of the fiber-reinforced material is heated in a state where a plurality of the fiber-reinforced materials are laminated such that the discontinued part of the reinforcing fiber is contacted together.

8. The process according to claim 1, wherein for a fiber-reinforced material having a thickness distribution, a temperature at an approximately central part in the thickness direction of the maximum thickness portion, which is Ta [° C.], is measured and the temperature condition of the contact heat source is determined such that a temperature at the minimum thickness portion, which is Tb [° C.], satisfies: Ta−5° C. <Tb<Ta+5° C.

9. The process according to claim 1, wherein a temperature capable of holding a viscosity of the thermosetting resin composition of 10 Pa·s or lower for 90 minutes or longer is held, a degree of impregnation of the thermosetting resin composition into the fiber-reinforced material is measured, and temperature increase is performed at a stage where impregnation is completed.

10. The process according to claim 1, wherein the fiber-reinforced material comprising the reinforcing fiber impregnated with the thermosetting resin composition is a partially impregnated prepreg having a first layer comprising at least the reinforcing fiber and a second layer comprising the reinforcing fiber impregnated with the thermosetting resin composition and has a degree of impregnation of the thermosetting resin composition into the fiber-reinforced material of 10 to 90 volume %, and the partially impregnated prepregs are laminated before heating.

11. The process according to claim 10, wherein the partially impregnated prepreg has the second layers on both sides of the first layer, the second layer has a layer A comprising the reinforcing fiber impregnated with the thermosetting resin composition and a layer B including a particle or a fiber of a thermoplastic resin, and the layer B is placed on the surface of the partially impregnated prepreg.

12. The process according to claim 10, wherein a thickness of a laminate obtained by laminating the partially impregnated prepregs is thicker by 5 to 50% than a thickness of the fiber-reinforced plastic after curing.

13. The process according to claim 11, wherein a thickness of a laminate obtained by laminating the partially impregnated prepregs is thicker by 5 to 50% than a thickness of the fiber-reinforced plastic after curing.

14. A process of producing a fiber-reinforced plastic comprising:
placing a fiber-reinforced material containing a reinforcing fiber impregnated with a thermosetting resin composition between a single-sided mold and a bagging film to form a closed space created by the single-sided mold and the bagging film;
sucking the closed space with a vacuum pump to pressurize the fiber-reinforced material by utilizing a pressure difference from an atmospheric pressure;
locally heating the fiber-reinforced material by using a contact heat source under a temperature condition different from an atmosphere temperature in a state wherein the fiber-reinforced material is pressurized and the temperature condition given by the contact heat source is continuously changed; and
curing the fiber-reinforced material to mold the fiber-reinforced plastic.

\* \* \* \* \*